Nov. 14, 1939.  H. SMOLOWITZ  2,179,763
WINDOW SHADE
Filed March 10, 1939

Harry Smolowitz INVENTOR
BY Victor J. Evans & Co.
ATTORNEYS

Patented Nov. 14, 1939

2,179,763

UNITED STATES PATENT OFFICE 2,179,763

WINDOW SHADE

Harry Smolowitz, Denver, Colo.

Application March 10, 1939, Serial No. 261,051

2 Claims. (Cl. 156—17)

This invention relates to window shades and has for an object to provide a window shade for automobile windows and other windows, in the nature of a slat blind disposed between two glass panes so as to be housed against the weather and dust.

A further object is to provide a device of this character in which the operating parts will be concealed from view and will be operated by a special key to prevent tampering with the shade.

A further object is to provide a shade of this character in which the slat blind may be lowered when not needed so as to be out of sight and permit unobstructed view through the window.

A further object is to provide a device of this character which will be formed of a few strong simple and durable parts, which will be inexpensive to manufacture and which will not easily get out of order.

With the above and other objects in view the invention consists of certain novel details of construction and combinations of parts hereinafter fully described and claimed, it being understood that various modifications may be resorted to within the scope of the appended claims without departing from the spirit or sacrificing any of the advantages of the invention.

In the accompanying drawing forming part of this specification,

Figure 3:
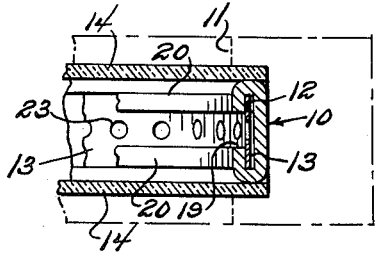
Figure 3 is a cross sectional view taken on the line 3—3 of Figure 1 showing one of the guides for a respective metal ribbon.

Referring now to the drawing in which like characters of reference designate similar parts in the various views, 10 designates a substantially U-shaped frame which may be inserted in the window opening 11 of an automobile, or other window opening. As best shown in Figure 3 the sides and bottom of the frame are provided with an interior guide opening 12 adapted to slidably receive respective metal ribbons 13, the purpose of which will later be explained.

On opposite sides of the U-shaped frame 10 glass panes 14 are secured in any preferred manner and a glass transverse member 15 bridges the upper ends of the U-shaped frame. Between the glass panes 14 a slat blind 16 of the "Venetian" type is disposed and is protected from the weather by the panes.

Figure 1:
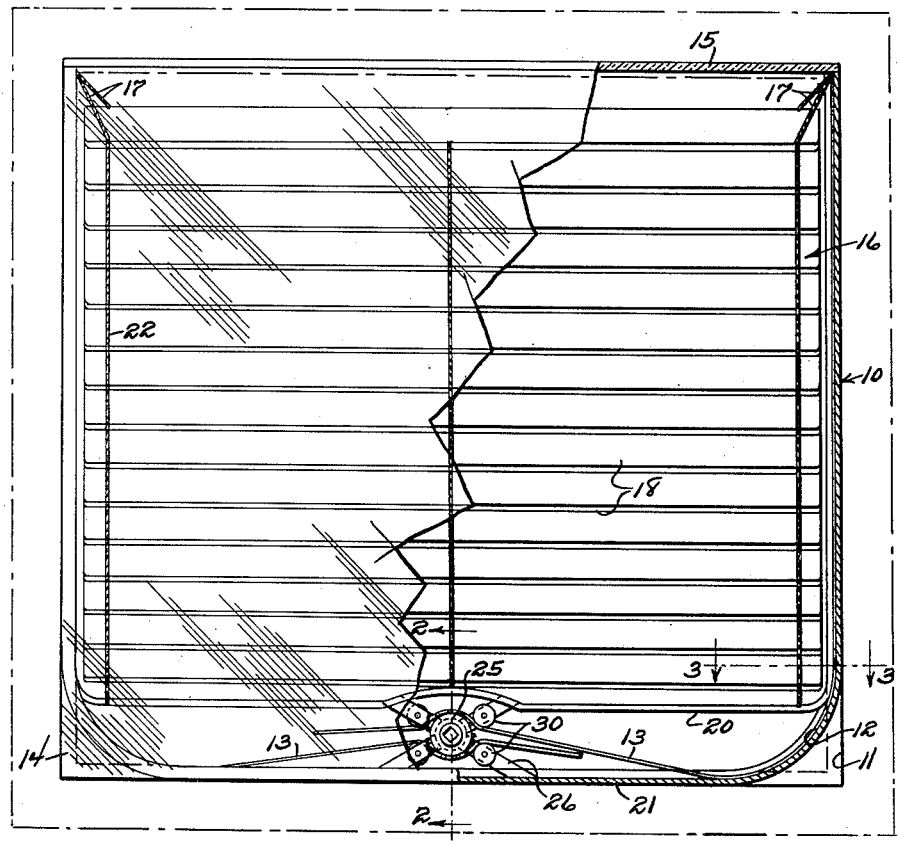
Figure 1 is a front elevation, with parts broken away, of a window shade constructed in accordance with the invention.
Figure 2:
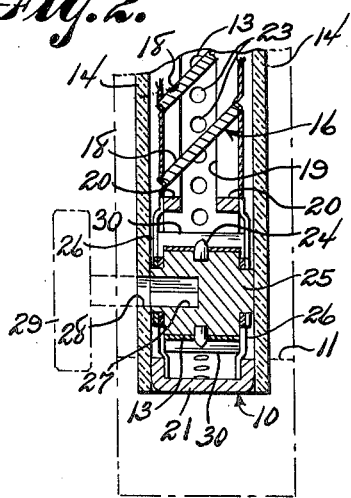
Figure 2 is a detail sectional view taken on the line 2—2 of Figure 1 and showing the actuating spool and perforated ribbons for operating the slat blind.

The beforementioned metal ribbons 13 are provided at their upper ends with cords 17 which are secured to respective longitudinal edges of the slats 18 of the slat blind as best shown in Figure 1. These cords pass downwardly through a slot 19 in a respective leg of the U-shaped frame when the metal ribbon is lowered in the interior slot 12 thereof and permit the slat blind to assume folded condition at the bottom of the frame so as to be concealed from view and permit clear vision through the panes 14. When the shade is to be used the ribbons 13 are moved upwardly in the slots 12 and raise the cords 17 to extend the slat blind to the position shown in Figure 1.

A bottom bar 20 bridges the legs of the U-shaped frame near the bottom transverse portion 21 thereof and to the bar 20 the slat blind is secured at its lower edge through the medium of cords 22 which are extensions of the cords 17 and are connected to longitudinal edges of the slats 18.

The metal ribbons 13 are provided with openings 23 adapted to engage cogs 24 formed on an operating spool 25 which is journaled at the ends in X-shaped side frames 26 secured to the stationary bar 20 and lower stationary member 21 of the U-shaped frame, as best shown in Figure 1. The spool is provided with an axial aperture which registers with an opening 28 in one of the window panes 14 and is adapted to receive a key 29 for turning the spool axially to feed out both ribbons simultaneously or retract both ribbons simultaneously in the hollow frame 10. The inner ends of the metal ribbons pass over the spool on opposite sides thereof as best shown in Figure 1 and are held in engagement with the cogs through the medium of rollers 30 carried by the X-shaped frames 26, to permit proper operation of the ribbon to raise and lower the slat blind.

Since the operation of the device has been described as the description of the parts progressed it is thought that the invention will be fully understood without further explanation.

What is claimed is:

1. A window shade comprising a substantially U-shaped frame having an interior guide opening in the legs and bottom thereof, front and rear glass panes secured to opposite sides of the frame, a slat blind within the frame between the panes, means for securing the blind at the bottom to the frame, perforated metal ribbons slidably mounted in the guide openings of the frame, cords connected to the slats of the slat blind and connected at the upper ends to the upper ends of respective ribbons, there being openings in the inner sides of the legs of the frame permitting of the upper ends of the cords receding downward to permit the slat blind to be folded at the bottom of the panes when the ribbons are moved downwardly in said guide openings, and a cog spool engaging said ribbons near the lower ends thereof and adapted to be rotated to simultaneously feed the ribbons upwardly to extend the slat blind or withdraw the ribbons downwardly to fold the slat blind.

2. A window shade comprising a slat blind, glass panes on opposite sides of the slat blind, a frame supporting the panes, a stationary support at the bottom of the frame, cords connecting the slat blind at its lower edge portion to said support, a pair of perforated ribbons secured to the upper edge portions of the blind at opposite sides thereof and slidably mounted in said frame, an operating spool disposed at the bottom of said frame and provided with cogs engaging in the perforations of said ribbons, rollers guiding the lower ends of the ribbons around opposite sides of the spool, a shaft for the spool, said shaft projecting through one of said glass panes, and means for operating the shaft for raising and lowering the ribbons in the frame to respectively raise and lower the slat blind.

HARRY SMOLOWITZ.